(12) United States Patent
Abe et al.

(10) Patent No.: US 7,182,117 B2
(45) Date of Patent: Feb. 27, 2007

(54) APPARATUS AND METHOD FOR APPLYING AN ADHESIVE FILM TO A SURFACE OF A STRUCTURE

(75) Inventors: Hidetoshi Abe, Yamagata pref. (JP); Toshihiko Nakayama, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 151 days.

(21) Appl. No.: 10/698,345

(22) Filed: Oct. 31, 2003

(65) Prior Publication Data
US 2005/0092425 A1    May 5, 2005

(51) Int. Cl.
B32B 37/10    (2006.01)
B32B 37/20    (2006.01)

(52) U.S. Cl. .................. 156/391; 156/461; 156/465; 156/468; 156/475; 156/485; 156/577; 156/579; 156/249

(58) Field of Classification Search ............... 156/391, 156/543, 574, 576, 577, 579, 443, 459, 581, 156/582, 461, 465, 468, 475, 477.1, 485, 156/249
See application file for complete search history.

(56) References Cited

U.S. PATENT DOCUMENTS

| | | | | |
|---|---|---|---|---|
| 2,934,790 A | * | 5/1960 | Shwayder | 264/156 |
| 4,083,153 A | * | 4/1978 | Sumpter | 52/28 |
| 4,113,538 A | * | 9/1978 | Green | 156/247 |
| 4,525,237 A | * | 6/1985 | Clar | 156/540 |
| 4,775,442 A | * | 10/1988 | Januska | 156/575 |
| 4,849,063 A | * | 7/1989 | McXinnon | 156/391 |
| D340,533 S | * | 10/1993 | Beaulieu et al. | D25/58 |
| 6,187,128 B1 | * | 2/2001 | Oosterlinck | 156/249 |
| 6,238,515 B1 | * | 5/2001 | Tsujimoto et al. | 156/379.8 |
| 6,450,228 B1 | * | 9/2002 | McLeod et al. | 156/356 |
| 6,811,645 B2 | * | 11/2004 | Bannert | 156/249 |
| 6,846,378 B2 | * | 1/2005 | Kuhn et al. | 156/248 |
| 2002/0172806 A1 | | 11/2002 | McLeod et al. | |
| 2002/0182415 A1 | | 12/2002 | McLeod et al. | |

FOREIGN PATENT DOCUMENTS

| | | |
|---|---|---|
| DE | 2 118 570 | 10/1972 |
| JP | 1993338627 A | 12/1993 |
| JP | 1994072014 A | 3/1994 |
| JP | 2001-130824 | 5/2001 |
| WO | WO 00/48935 | 8/2000 |

* cited by examiner

Primary Examiner—Mark A. Osele
(74) Attorney, Agent, or Firm—Colene H. Blank (57) ABSTRACT

A film dispenser for applying an adhesive film to an elongated structure has a mounting frame, guide members on the bottom portions of the mounting frame sides to engage the shoulder portions of the elongated structure to allow movement of the apparatus in relation to the elongated structure while the guide members remains engaged with the shoulder portions, and roll mounting assembly for securely receiving a film roll near the top leading end of the apparatus. When the guide members are engaged to the shoulder portions of the elongated structure, an end of the adhesive film is applied onto the surface of the elongated structure, the apparatus is then slid to dispatch more adhesive film with controlled and consistent lateral positioning in relation to the surface of the elongated structure.

19 Claims, 6 Drawing Sheets

APPARATUS AND METHOD FOR APPLYING AN ADHESIVE FILM TO A SURFACE OF A STRUCTURE

CROSS-REFERENCE TO RELATED APPLICATION(S)

None.

BACKGROUND OF THE INVENTION

The present invention relates to applying an adhesive film to a surface of a structure. More specifically, the present invention relates to applying an informative, decorative, or protective adhesive film to a surface of an elongated structure such as an escalator handrail, or the handrail of a people mover.

Films of various types are widely used to cover a surface of a structure. The properties, purposes and functions of the films used to cover a surface of a structure are diverse, including providing information, decoration, protection or dust removal. In this disclosure, a film that is to be applied on a surface of a structure for any utility is referred to as an application film, or simply as a film, depending on the context.

The methods and apparatus used for applying a film on a surface of a structure vary widely, depending on the characteristics of both the application film and the structure on which the application film is applied. One of the typical type of applications involve a continuous film web and an elongated structure having a mostly flat major surface. For example, it is desirable to apply a continuous film web bearing advertisements on an escalator or people mover handrail. The utility of such an application is readily appreciated. Escalator or people mover handrails are found in some of the busiest places such as shopping centers or airports. Although handrails typically have plain black appearances, it is recognized that an informative, decorative or protective adhesive film may be advantageously used to cover an exterior surface of an escalator or people mover handrail. Particularly, because a typical rider of an escalator spends an appreciable length of time on the escalator, and the rider usually performs no other significant activities during the ride, an advertisement displayed on the handrail of the escalator is likely to effectively attract the rider's attention.

A film, particularly an adhesive film, can be simply applied by a totally manual method. That is, the piece of film can be dispatched by hand, moved to a surface and manually applied on to the surface. The problem of a totally manual method is that it is not only slow, but also results in an unsatisfactory product. For example, in a case where a long segment of a film strip is applied onto an elongated surface, it is difficult to avoid wrinkles of the applied film. If the film has an image, it is also difficult to avoid distortions of the image.

Efforts have been made in the art to facilitate applying a film on a surface of a structure. Unexamined Japanese patent application JP1993338627, for example, discloses a device for applying an adhesive tape to a surface of a frame. The device according to the above patent application is both a film dispenser and a film applicator. For the dispensing purpose, the device uses a segment of the film stamped out of a longer film stock to be fed into the entering path. For the purpose of application, the device stretches the film in order to apply it onto the frame. Furthermore, in order for the device to separate the film from an associated release paper, the release paper has to be relatively rigid and not easily bent with the film.

PCT patent application WO 00/48935 and published U.S. patent application 20020182415 A1, which U.S. patent application is fully incorporated herein by reference, disclose a method of applying a film to a handrail of an escalator or moving walkway. The method uses an apparatus mounted to a balustrade. When in use, the handrail is driven past the apparatus, causing the film to be unrolled from the first roll with a means for applying pressure causing the film to adhere to the handrail. While the device according to these patent applications once properly mounted is relatively automatic, it has to be mounted to a stationary balustrade, and the balustrade must have a surface suitable for receiving the mounting means having a vacuum cup. The device also requires a complicated alignment method in order to center the film in relation to the surface of the handrail. Because the film is dispensed and applied while the handrail is moving, reliable mounting and precise alignment has to be achieved carefully before the apparatus can be used.

The present invention provides an alternate way to dispense end applying a film on a surface of an elongated structure. The film dispenser and the method are relatively simple and avoid certain problems of the prior art devices and methods.

BRIEF SUMMARY OF THE INVENTION

The present invention is a film dispenser for applying an adhesive film to an elongated structure, such as an escalator handrail or people mover handrail, which has an elongated top surface and shoulder portions on opposing sides of the elongated top surface, the shoulder portions defining a surface width. The film dispenser comprises: a mounting frame having first and second frame side panels opposing each other, the frame side panels together defining a trailing end, a leading end, a top side and a bottom side for the film dispenser, and bottom portions of the first and the second frame side panels defining a sleeve having a sleeve width at least the same as the surface width; guide members on the bottom portions of the first and the second frame side panels to engage the shoulder portions of the elongated structure to allow movement of the film dispenser in relation to the elongated structure while the guide members remain engaged with the shoulder portions; and a roll mounting assembly for securely and rotatably receiving a film roll on the top side and adjacent the leading end of the film dispenser.

In one embodiment, the guide members comprises at least a first pair of guide rollers mounted within the sleeve, the first pair of guide rollers opposing each other and defining a channel into which the shoulder portions of the elongated structure can enter to engage the guide rollers.

The present invention is also a method of applying an adhesive film on a surface of an elongated structure. The method comprises: engaging a slidable film dispenser in accordance with the present invention with the elongated structure; separating an end section of a two-layer film into an adhesive application film and a liner; directing the separated end section of the adhesive application film toward the trailing end of the slidable film dispenser; applying the separated end section of the adhesive application film at a beginning position on the surface of the elongated structure; directing the separated end section of the liner toward the leading end of the slidable film dispenser; sliding the slidable film dispenser toward the leading end to unwind the two-layer film; and applying a desirable portion of the separated adhesive application film on the surface of the elongated structure.

The design of the film dispenser in accordance with the present invention, particularly with regard to the use of guide members such as guide rollers and the use of a roll mounting assembly for securely and rotatably receiving a film roll, allows the film to be unwound with controlled and consistent lateral positioning in relation to the surface of the elongated structure without stretching the film.

The present invention provides a simple and effective way to apply an adhesive film, such as a film which bears advertisement information, on the surface of an elongated structure with sufficiently precise alignment of the film in relation to the surface of the elongated structure. The film dispenser in accordance with the present invention is hand usable, does not require sophisticated alignment method (such as laser alignment), and does not require a stationary balustrade suitable for mounting the apparatus. On the other hand, the film dispenser in accordance with the present invention achieves significantly better quality than conventional manual application of an adhesive film on the surface.

BRIEF DESCRIPTION OF THE DRAWINGS

The present invention will be further explained with reference to the drawing figures listed below, wherein like structure is referred to by like numerals throughout the several views.

DETAILED DESCRIPTION

Figure 1:
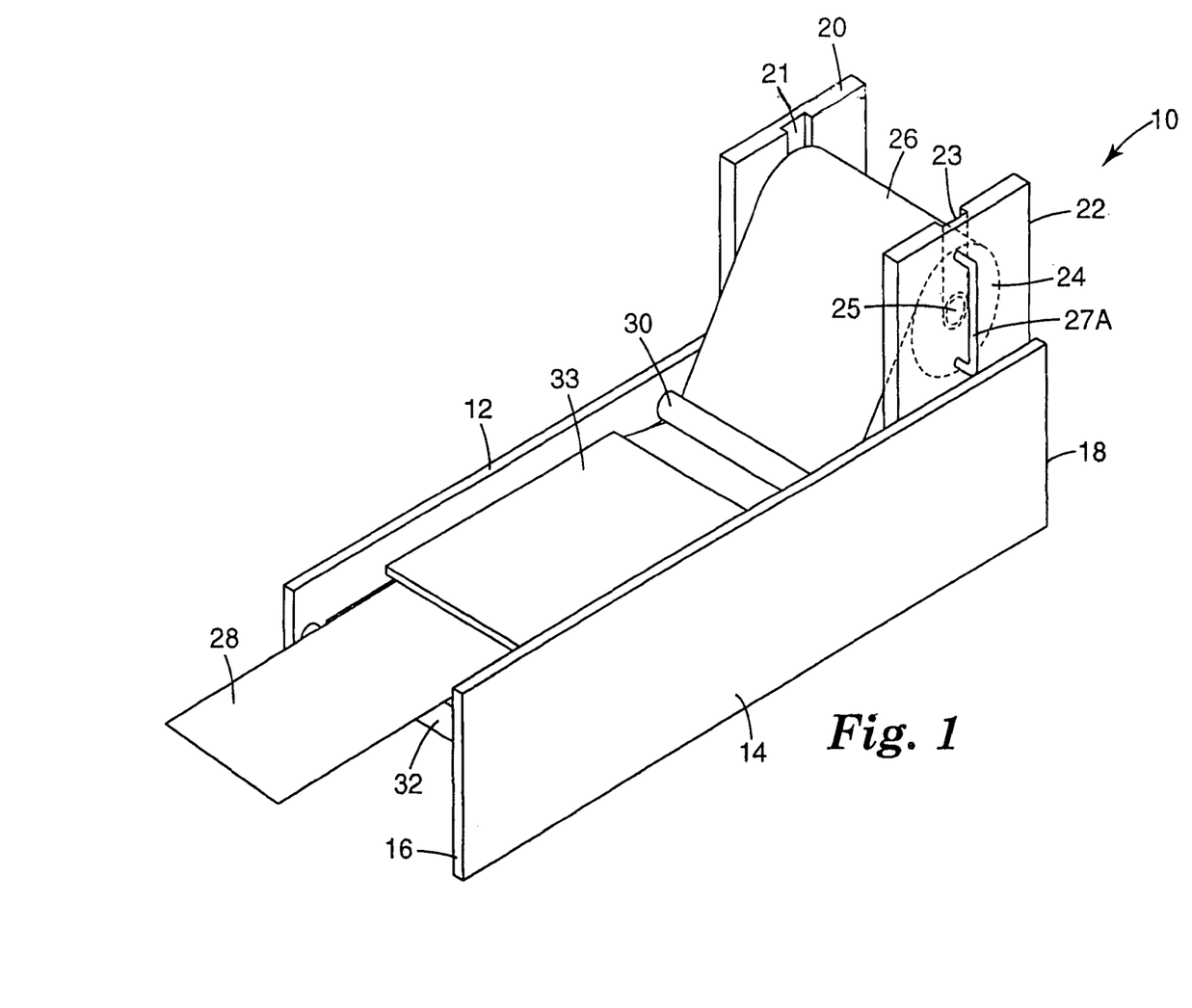
FIG. 1 is a perspective view of a film dispenser in accordance with the present invention.

FIG. 1, which is a perspective view of the present invention, shows film dispenser 10 which has first frame side panel 12 and second frame side panel 14 making up the main part of a mounting frame. First frame side panel 12 and second frame side panel 14 have an elongated shape a long a longitudinal direction, and oppose each other across a lateral direction transversing the longitudinal direction. First frame side panel 12 and second frame side panel 14 together define trailing end 16 and leading end 18 of film dispenser 10, a top side (facing up in FIG. 1), and a bottom side (facing down in FIG. 1).

On the top side of film dispenser 10 is a roll mounting assembly having a pair of mounting walls 20 and 22 connected to first frame side panel 12 and second frame side panel 14, respectively. Mounting walls 20 and 22 face each other to define a receiving space to receive a film roll 24, which is adapted to hold a length of two-layer film 26 wrapped around axis 25. Mounting walls 20 and 22 have slots 21 and 23, respectively, through which slots axis 25 is placed or replaced vertically. When received in the receiving space defined by mounting walls 20 and 22, film roll 24 is rotatable to unwind the wrapped two-layer film 26 in a direction toward trailing end 16. Additionally, handles 27A and 27B are placed on mounting walls 20 and 22 to facilitate manual handling of film dispenser 10.

The unwrapped section of two-layer film 26 follows a processing path as follows: film 26 passes under pressure bar 30, then under flattening panel 33, and reaches separation bar 32, where two-layer film 26 is separated (delaminated) into adhesive application film 28 and liner 29 (shown in FIG. 5 and FIG. 6, not shown in FIG. 1).

Figures 2, 3:
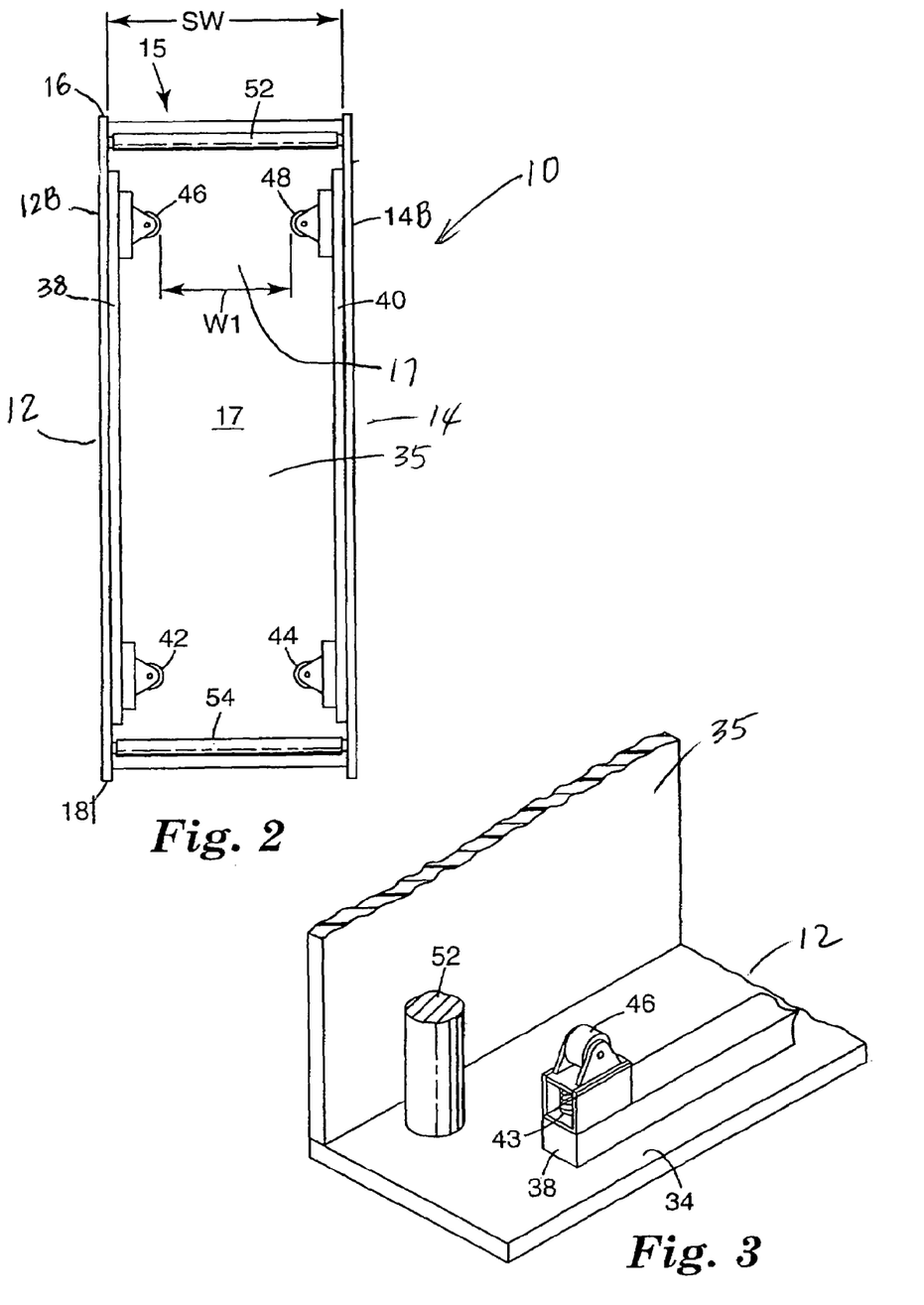
FIG. 2 is a view from the bottom of the film dispenser in accordance with the present invention.
FIG. 3 is a perspective view of an enlarged section of the film dispenser in accordance with the present invention showing details of one embodiment of a guide member.

As shown in FIG. 2, which is a view from the bottom of film dispenser 10, frame side panels 12 and 14 together define a sleeve 15 having a sleeve width SW. Dividing panel 35 divides frame side panels 12 and 14 into upper portions (12A and 14A in FIG. 4, not shown in FIG. 2) and lower portions 12B and 14B. Inside sleeve 15 are first pair of guide rollers 42 and 44 and second pair of guide rollers 46 and 48 mounted on guide roller mounting members 38 and 40. Guide rollers 42 and 44 are laterally spaced across sleeve 15 to oppose each other. Similarly, guide rollers 46 and 48 are laterally spaced across sleeve 15 to oppose each other. First pair of guide rollers 42 and 44 and second pair of guide rollers 46 and 48 are spaced longitudinally from each other along sleeve 15. Guide rollers 42, 44, 46 and 48, so arranged, define channel 17 having channel width $W_1$ which is narrower than sleeve width SW of sleeve 15. As will be shown in other views, an elongated structure enters channel 17 during the operation of film dispenser 10. FIG. 2 also shows cross bars 52 and 54 which connect frame side panels 12 and 14.

FIG. 3, which is a perspective view of an enlarged section of film dispenser 10, shows details of one guide roller (e.g., guide roller 46) according to one embodiment of the present invention. FIG. 3 is viewed from trailing end 16 of film dispenser 10. As shown in FIG. 3, guide roller 46 is mounted via spring 43 onto guide roller mounting member 38. Each of the guide rollers (42, 44 and 48) each a configuration similar to that of guide roller 46. In this manner, guide rollers 42, 44, 46 and 48 are slightly movable in the lateral direction, and biased by their respective springs inwardly toward the channel. As a result, when guide rollers 42, 44, 46 and 48 engage shoulder portions (e.g., 64 and 66 in FIG. 5) of an elongated structure, channel width $W_1$ of channel 17 is slightly variable.

Figure 4:
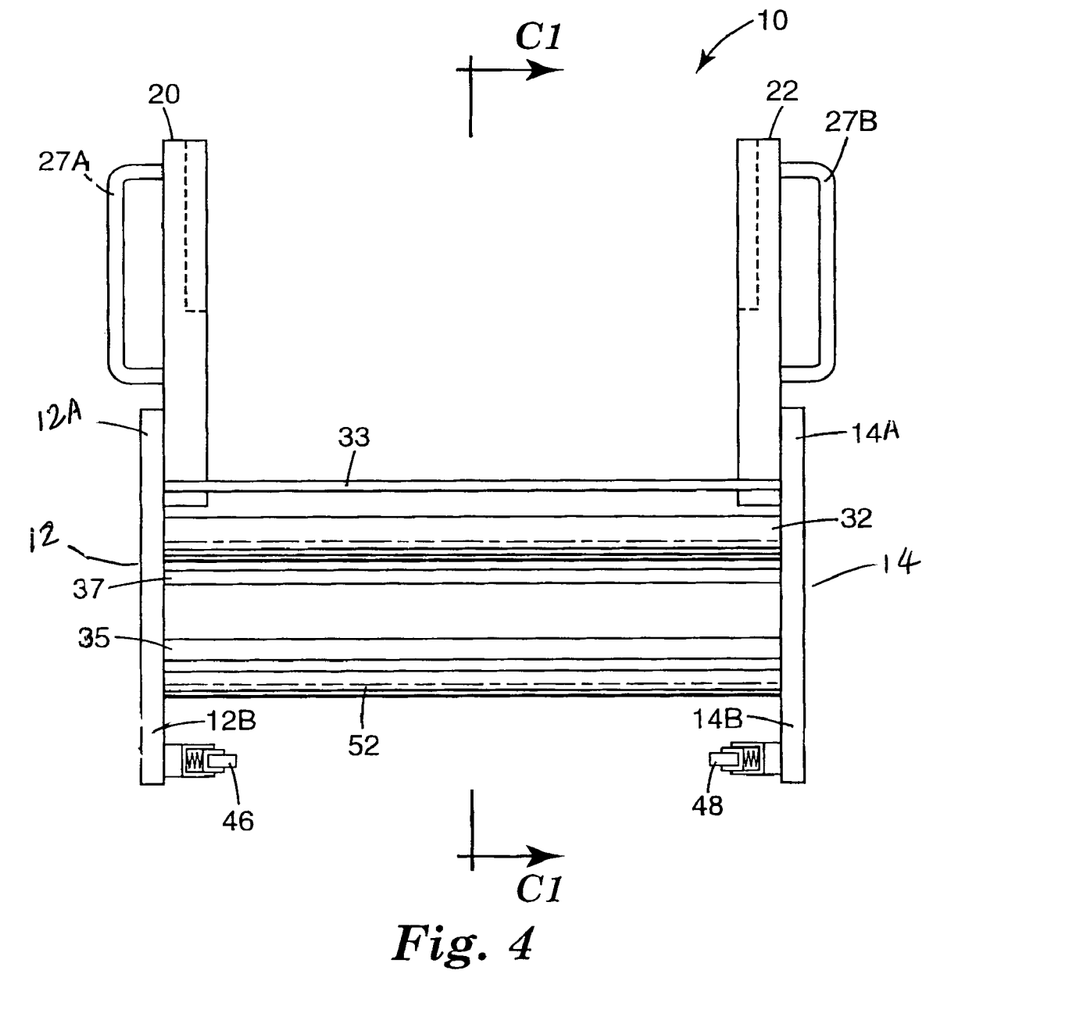
FIG. 4 is an end view of the film dispenser in accordance with the present invention when viewed from a trailing end.

FIG. 4 is an end view of film dispenser 10 when viewed from trailing end 16 (without any film disposed therein). In this view, the structural arrangement of the components, including frame side panels 12 and 14, bottom portions 12B and 14B of frame side panels 12 and 14, two guide rollers 46 and 48 adjacent to trailing end 16, flattening panel 33 and dividing panel 35, and mounting walls 20 and 22, is further illustrated. FIG. 4 also shows a full view of separation bar 32 adjacent to trailing end 16 of film dispenser 10.

Figure 6:
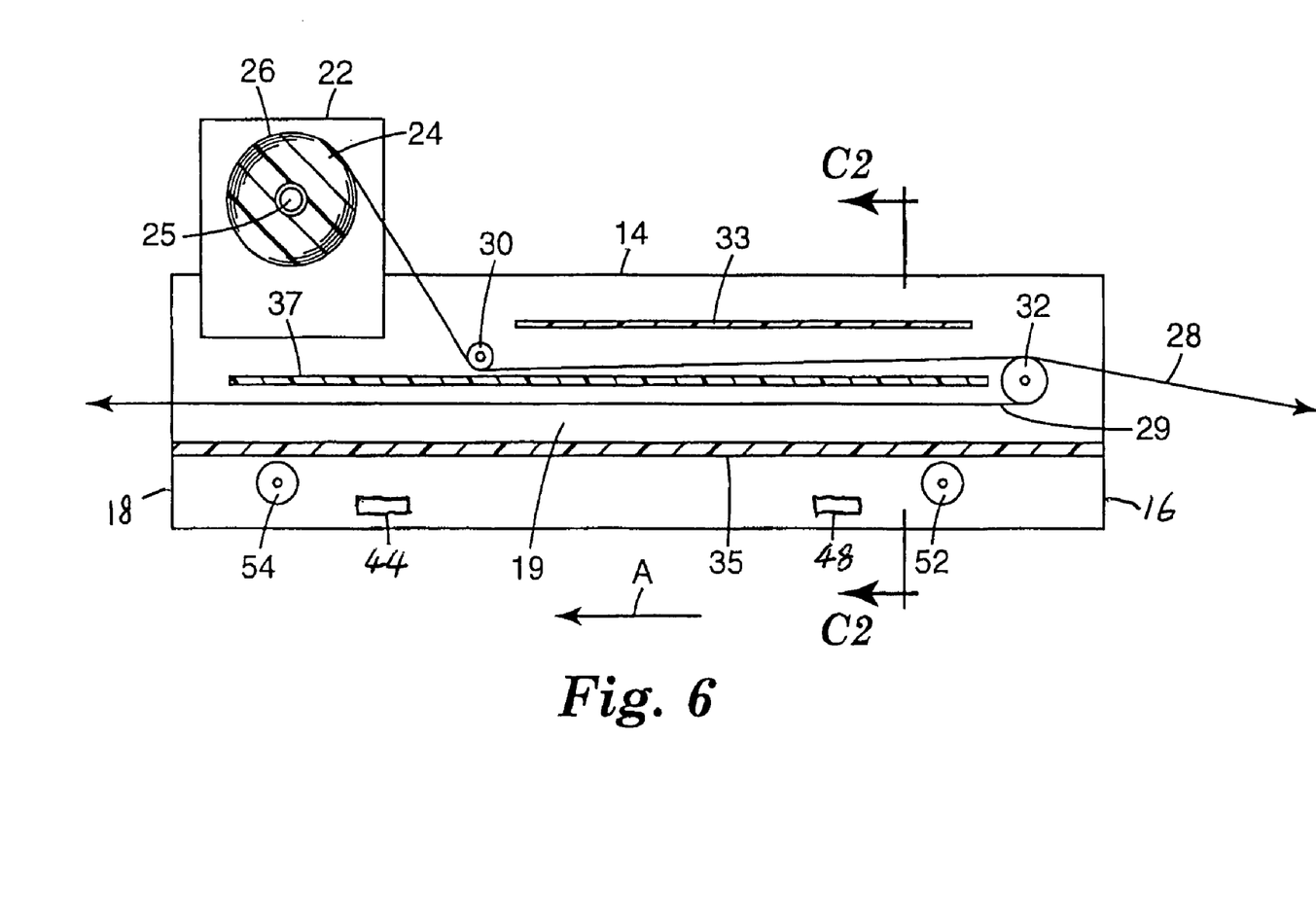
FIG. 6 is a cross-sectional view of the film dispenser in accordance with the present invention as taken along a longitudinal centerline C1—C1 in FIG. 4 of the film dispenser.
Figure 7:
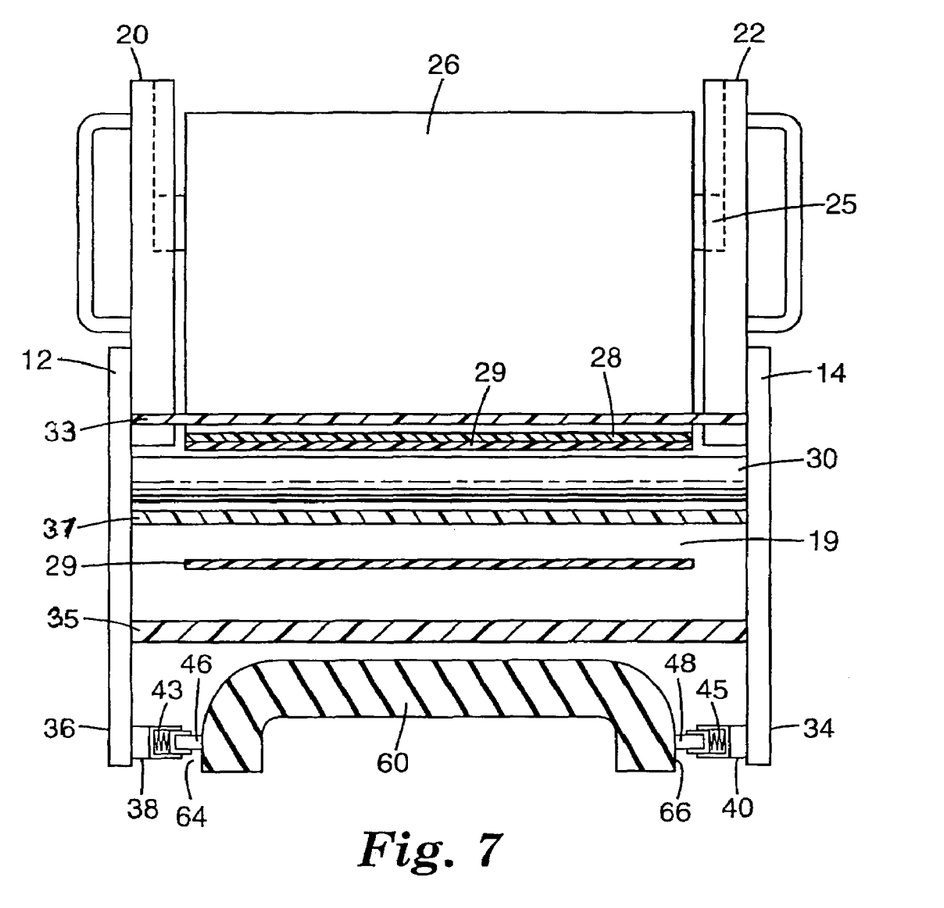
FIG. 7 is a cross-sectional view of the film dispenser in accordance with the present invention as taken along a line C2—C2 in FIG. 6.

Separation bar 32 assists to separate two-layer film 26 (FIG. 1) after it is unwound from the securely received film roll 24 into adhesive application film 28 (FIG. 1) and liner 29 (shown in FIG. 6 and FIG. 7, not shown in FIG. 4). As will be shown in later views, particularly with reference to FIG. 6, separation bar 32 is also the point where the separated liner 29 is turned back toward leading end 18 of film dispenser 10.

Figure 5:
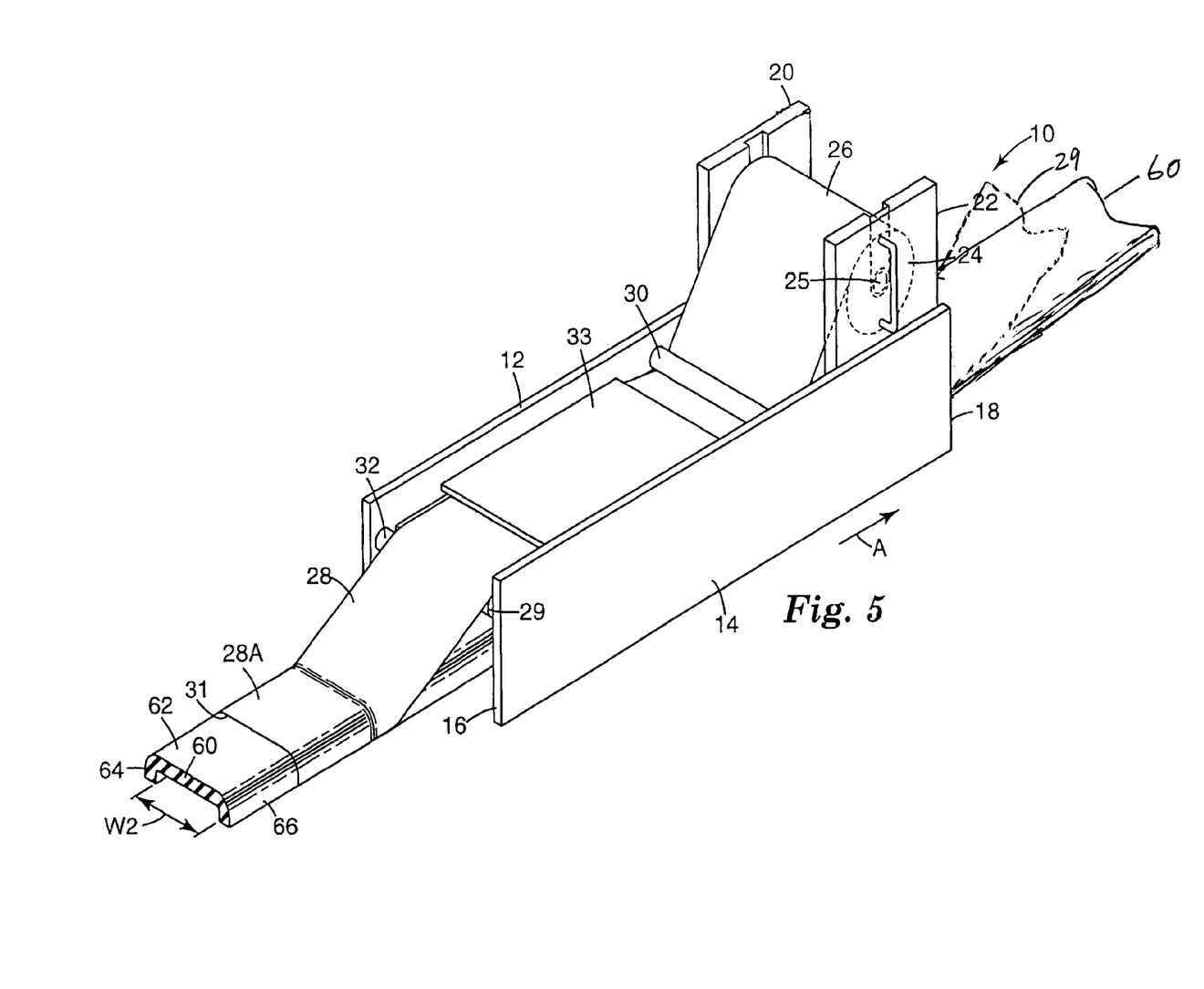
FIG. 5 is a perspective view of the film dispenser in accordance with the present invention when it is mounted on an elongated structure.

Reference is now made to FIG. 5, which is a perspective view of film dispenser 10 when it is mounted on elongated structure 60. This view shows how film dispenser 10 is used to dispense application film 28. Elongated structure 60 has elongated top surface 62 and two shoulder portions 64 and 66 each on an opposing side of elongated top surface 62. Shoulder portions 64 and 66 together define a surface width $W_2$. When viewed in conjunction with FIG. 2 and FIG. 4, it is readily seen that during use, elongated structure 60 enters channel 17 (FIG. 2), which is inside sleeve 15, to engage guide rollers 42, 44, 46 and 48 (FIG. 2).

Herein, the terms "shoulder", "shoulder portion", "engage", "engaging", and "engaged" are broadly understood. The meaning of these terms is mostly defined by the functional context in accordance with the present invention, rather than certain particular geometrical shapes. While a shoulder or a shoulder portion must at least be distinctive from the major flat surface of the structure, it does not have to be the same as that shown in FIG. 5. For example, although a shoulder portion needs to form an angle with the major flat surface (e.g., top surface 62 in FIG. 5) in order to engage a guide member in accordance with the present invention, it does not have to be at an approximate right angle with the major flat surface. Although a shoulder portion needs to be adjacent and connected to the major flat surface and remains stationary when the major surface is stationary, it does not have to be a one unit piece with the major flat surface or to form only an integral part of the same surface with the major flat surface. Terms "engage", "engaging", or "engaged" mean that two relevant parts physically contact each other. In the embodiment shown, guide rollers 42, 44, 46 and 48 nip on corresponding shoulder portions 64 and 66.

Liner 29 is shown in FIG. 5 to be underneath adhesive application film 28 as it is separated therefrom by separation bar 32 and turned back roughly 180° toward leading end 18 of film dispenser 10.

In designing film dispenser 10 in accordance with the present invention, channel width $W_1$ is selected according to surface width $W_2$ of the elongated structure on which the film dispenser is to be used. Preferably, $W_1$ is measured when springs (43 and 45 and other springs that are not shown) are relaxed and should be about the same or slightly smaller than $W_2$ in order to create a nipping effect when guide rollers engage the shoulder portions of the structure. For example, a typical escalator handrail has a width of about 80 mm. The dimensions of a suitable film dispenser, particularly channel width $W_1$, should be designed accordingly, together with the consideration that the flexibility of the springs provides a certain degree of variation of channel width $W_1$.

The main structural components of film dispenser 10, particularly frame side panels 12 and 14, mounting walls 20 and 22, and preferably also flattening panel 33, and dividing panels 35 and 37, are made of a rigid material. The material is preferably relatively light and has good manufacturability such as good characteristics for a molding process. Although acrylic has been used to make a satisfactory prototype of film dispenser 10, a variety of other materials may be used in actual production. In a particular prototype, frame side panels 12 and 14 and mounting walls 20 and 22 are made from 18 mm thick acrylic panels, while flattening panel 33 and dividing panels 35 and 37 are made from 8 mm thick acrylic panels.

In operation, film dispenser 10 is first engaged with elongated structure 60. The elongated structure 60 is received within channel 17, with cross bars 52 and 54 (FIG. 2 and FIG. 4) being near or engaging top surface 62 of elongated structure 60. An end section of two-layer film 26 is unwrapped and directed toward trailing end 16 of film dispenser 10. An unwrapped end section of two-layer film 26 is separated into adhesive application film 28 and liner 29. The separated end 28A of adhesive application film 28 is further led to, and applied at, beginning position 31 onto top surface 62 of elongated structure 60. At the same time, the separated end section of liner 29 is directed at separation bar 32 toward leading end 18 of film dispenser 10. Liner 29 makes a sharp turn (approximately 180°) at separation bar 32 and at least partially wraps around separation bar 32.

Film dispenser 10 is then slid toward leading end 18. During the sliding operation, because separated end 28A of adhesive application film 28 has been applied onto top surface 62 and adhesively anchored at beginning position 31, tension is formed on two-layer film 26 to pull film 26 toward trailing end 16 of film dispenser 10. Since film roll 24 is securely received into the receiving spaced defined by mounting walls 20 and 22 and does not move longitudinally in relation to the mounting frame (12 and 14) and mounting walls 20 and 22, a rotation torque is transferred to film roll 24 to make it rotate around axis 25. The rotation of film roll 24 causes film 26 to be unwound from film roll 24.

The separation bar 32 assists to separate liner 29 from adhesive application film 28 and direct the separated liner 29 toward leading end 18.

After a sufficient length of film 26 has been unwrapped and separated, a desirable portion of the separated adhesive application film 28 is applied on surface 62 of elongated structure 60. Separated liner 29 is further pulled from leading end 18 of film dispenser 10 and discharged from there if necessary (as illustrated by liner 29 shown in phantom in FIG. 5). This process is repeated as necessary to complete the application of the film on a segment of elongated structure 60 that need to be covered by adhesive application film 29.

Adhesive application film 29, once dispensed with proper anchoring and alignment on surface 62 of structure 60, may be further applied onto surface 62 using any method known in the art, including by hand or using a squeegee. After the film application is done, film dispenser 10 is removed from elongated structure 60. The cut ends of the applied film (application film 29) may be secured by covering them using an edge sealing tape (such as transparent over-lamination film VS10482, available from 3M Corp., St. Paul, Minn., USA). If a usable amount of film 26 remains in film roll 24, the cut ends of the remaining film may also be covered are secured if desirable.

Flattening panel 33 assists to constrain the unwrapped film 26 so that the smooth and consistent dispensing and applying of the film is more readily achievable. Flattening panel 33 further provides friction through rubbing with the unwrapped film 26 that is passing through underneath flattening panel 33. This friction is helpful to prevent unneeded unwrapping of film 26 from happening when the operator stops moving film dispenser 10 along elongated structure 60.

Dividing panels 35 and 37 mainly provide a channel (channel 19 in FIGS. 6 and 7) for unwrapped and separated liner 29 to pass through toward leading end 18. This prevents unwrapped and separated liner 29 from being tangled with other components or films, and further makes it easier to remove unwrapped and separated liner 29 from leading end 18.

The structure and operation mode of film dispenser 10 are further illustrated in FIGS. 6 and 7. FIG. 6 is a cross-sectional view of film dispenser 10 taken along a longitudinal centerline C1—C1 (FIG. 4) of film dispenser 10. Arrow A indicates the sliding direction of film dispenser 10 during a normal operation. In this view, dividing panels 35 and 37 are shown to define channel 19 through which the separated liner 29 is directed toward leading end 18 of film dispenser 10.

FIG. 7 is a cross-sectional view of film dispenser 10 taken along a lateral cutting line C2—C2 (FIG. 6). In this view, the relative positions of the following parts are shown: elongated structure 60, shoulder portions 64 and 66, guide rollers 46 and 48, springs 43 and 45, guide roller mounting members of 38 and 40, frame side panels 12 and 14, flattening panel 33, dividing panel 35 and dividing panels 35 and 37, film 26 and its two layers (adhesive application film 28 and liner 29), and the separated liner 29 passing underneath dividing panel 37 toward leading end 18 (into the paper, not shown). Channel 19 which directs the separated liner 29 toward leading end 18 is also further shown in FIG. 7.

Although not necessary in principle, it is preferred that the operation of film dispenser 10 is done while elongated structure 60 itself is stationary. This provides better stability, control and accuracy in film application and avoids the necessity of one or more operators of film dispenser 10 having to negotiate with a moving surface (e.g., surface 62 of elongated structure 60) or its associated moving components (i.e., a moving walkway or escalator stairway).

Due to the rigid and relatively straight elongated shape of film dispenser 10, it is most usable on a surface that is substantially flat and linear. When used on an escalator or people mover handrail, for example, because only a segment of the handrail is presented in a linear shape at any given time, it is necessary to apply the film onto a first linear portion of the handrail, and then move the handrail to align a second portion of the handrail to a linear position in order to apply the film onto the second linear portion of the handrail.

The present invention provides a simple yet efficient way to apply an adhesive film, such as a film bearing advertisement information or a protective film, onto a top surface of an elongated structure with sufficiently precise alignment of the film in relation to the surface of the elongated structure. The film dispenser can be used to apply an application film onto a relatively short length of surface but can also be used to apply an application film in a continuous web in roll form onto a relatively long length of surface. Samples of the film dispenser in accordance with the present invention have been successfully used to apply an adhesive film onto an escalator handrail segment longer than 30 meters in a continuous application mode.

The film dispenser in accordance with the present invention is hand usable, does not require sophisticated alignment method (such as laser alignment), and does not require additional mounting or alignment surfaces (such as a stationary balustrade) for mounting the apparatus for use. On the other hand, the apparatus in accordance with the present invention achieves significantly better quality than mere manual application of an adhesive film on a surface.

The present invention is a combination of the following: using guide members to engage a shoulder portion of an elongated structure to ensure precise and consistent relative alignment between the film dispenser and the elongated structure; using a roll mounting member for securely and rotatably receiving of film roll; and using as an anchoring point an end of the film that has already been applied onto the surface to ensure that the film is automatically unwound from the film roll during a sliding operation of the film dispenser. A mounting frame is used to define a rigid longitudinal dimension and lateral dimension and to host the guide members and the roll mounting member. The film roll is fixable in the lateral direction such that a length of film unwound from the film roll maintains a consistent lateral position in relation to the elongated structure. If desirable, the film roll can be laterally fixed in a central position such that the film unwound from the film roll maintains a central lateral position in relation to the elongated structure.

Those skilled in the art will readily appreciate that various embodiments may be used to embody the above essential invention concept. For example, methods other than using guide rollers (42, 44, 46 and 48) may be used to create a channel through which shoulder portions of the elongated structure may pass engagingly. Guide members for achieving such a purpose may simply be side walls or skids snugly and slidably contacting the shoulder portions of the elongated structure. In addition, guide members (such as guide rollers 42, 44, 46 and 48 in the shown embodiment) do not have to be mounted on separate mounting members (e.g., guide roller mounting members 38 and 40 in FIG. 2), but can be directly mounted on bottom portions 12B and 14B of frame side panels 12 and 14.

Furthermore, any method or mechanism commonly known in the art, including a spindle mechanism, may be used in place of the roll mounting assembly shown in the embodiment of FIGS. 1–7 to achieve the function of securely and rotatably receiving a film role in accordance with the present invention. A significant advantage of the present invention as compared to a totally manual method is that the adhesive application film is automatically dispensed, without stretching, in a precise and consistent lateral alignment in relation to the underlying elongated structure. This ensures an eventual wrinkle-free and distortion-free application of the dispensed film (both laterally and longitudinally). For this feature alone, the width of the adhesive application film is not required to cover the entire surface (top surface and shoulder portions) of the elongated structure. The width of the adhesive application film is further not required to cover the entire top surface of the elongated structure. The width of the adhesive application film is further not required to be precisely centered in relation to the elongated structure, because it is mostly the straightness and consistent relative lateral alignment of the film in relation to the elongated structure that contributes to the wrinkle-free and distortion-free application. For appearance or other reasons, however, in one embodiment, at least the adhesive application film has a width that is sufficient to cover the entire surface of the elongated structure. In some embodiments, the adhesive application film is a centered on the surface of the elongated structure.

The film (26) is not required to be a two-layer film having a liner (29) in addition to an application film (28). It is known in the art that linerless adhesive film can be dispensed in a roll form. Using of a liner, however, not only improves the characteristics of the film dispensing but also makes a wider range of adhesives available. For example, some adhesives may have superior adhesive property when applied on the surface of a certain material but may be difficult to use in a roll form without a liner. In this situation, using a matching liner will make such adhesives usable for the purpose of applying onto the surface of the particular material.

Various types of films, including those disclosed in PCT patent application WO 00/48935 and published U.S. patent application 20020182415 A1, which U.S. patent application has been incorporated by reference, may be used. The selection of the application film includes two aspects of the consideration as discussed below.

The first aspect relates to the purpose of application. If the application film is used for information such as advertisements, the film should bear a message or an image suitable for such a purpose and the message or the image should be visible by a viewer. Various methods, such as heat transferable image process, may be used to print or transfer an image onto a film. For example, heat transferable digital image can be made by Scotchprint™ 9512 electrostatic printers system (made by 3M Corporation, St. Paul, Minn., USA) on Trident transfer media (made by 3M Corp.). The digital image is then heat transferred onto a white urethane receptor adhesive film (such as Scotchcal™ film 1100-10, made by 3M Corp.) by using an Orca III heat laminator (made by GBC, Northbrook, Ill.). Successful samples of this type were made under the following operation conditions: upper roll temperature 135° C., lower roll temperature 50° C., operation speed 70 cm/min., and role nip pressure 60 psi.

If the application film is used for protection purposes, the film should have properties suitable for such purposes. Information purposes and protection purposes may be used in combination. In addition, regardless of whether the film itself protects the underlying surface of the structure, the images on the application film itself may need to be protected. For this purpose, the application film itself may be a multilayer film, including an adhesive application film covered by an additional protection film. The additional protection film may also function as a toner film, or alternatively, a separate toner film may be laminated together with the adhesive application film and the protection film. Successful examples of such multilayer films were made at room temperature using over-lamination film VS 10482 made by 3M Corp.

The second aspect of selecting an applicable film relates to its adhesiveness to the surface of the structure on which the film is applied. Depending on the purpose of the application, the applied film may either designed to be permanent or removable. This affects the selection of the adhesive on the application film. The performance of an adhesive further depends on the characteristics of the surface on which the film is applied. For example, if Scotchcal™ film 1100-10 (e.g., having an adhesive layer comprising a 2-methyl-butyl-acrylate and acrylic acid copolymer cross-linked by bisamide), may be used on an escalator or people mover handrail for adequate firm adhesion, the handrail may need to be made of Hypalon rubber instead of the conventional styrene butadiene rubber (SBR). The adhesive on Scotchcal™ film 1100-10 does not adhere adequately on SBR but is adequate on Hypalon rubber. Hypalon rubber is a chlorosulphonated rubber (made of chlorosulfonated polyethylene) made by Dupont, Wilmington, Del., USA. Chlorosulphonated rubber has enhanced UV protections and is pigmentable.

A separation bar (32) to assist separation between the application film (28) and the liner (29) and to redirect the liner toward the leading end of the film dispenser. Although the separation between the application film and the liner may be done in any way known in the art in order to practice the present invention, the separation bar illustrated in an embodiment of the present invention provides a simple and effective separation and further provides assistance in directing the separated liner.

Those skilled in the art will also readily appreciate that additional features, such as pressure bar 30, flattening panel 33, dividing panels 35 and 37, and crossing bars 52 and 54 help to further improve the basic design of the film dispenser in accordance with the present invention, but the disclosure of these additional features is not meant to be limiting as to the required structure or methodology of the present invention.

Although the present invention has been described with reference to preferred embodiments, workers skilled in the art will recognize that changes may be made in form and detail without departing from the spirit and scope of the invention.

The invention claimed is:

1. An apparatus for dispensing an adhesive film onto an elongated structure which has an elongated top surface and two shoulder portions each on an opposing side of the elongated top surface, the two shoulder portions defining a surface width, the apparatus comprising:

a mounting frame having first and second frame side panels opposing each other, the frame side panels together defining a trailing end, a leading end, a top side and a bottom side for the apparatus, and bottom portions of the first and the second frame side panels defining a sleeve having a sleeve width at least as wide as the surface width;

guide members on the bottom portions of the first and the second frame side panels to engage the shoulder portions of the elongated structure to allow movement of the apparatus in relation to the elongated structure while the guide members remain engaged with the shoulder portions;

a roll mounting assembly for securely and rotatably receiving a film roll on the top side and adjacent the leading end of the apparatus, and a separation bar adjacent the trailing end of the apparatus, wherein the separation bar assists to separate a two-layer film unwound from the securely received film roll into a first layer and a second layer such that the first layer is directed in a direction toward the trailing end onto the elongated structure while the second layer is directed in a direction toward the leading end of the apparatus;

wherein the apparatus is hand useable and is configured to dispense an adhesive film onto a stationary elongated structure.

2. The apparatus of claim 1, wherein the guide members comprise at least a first pair of guide rollers mounted within the sleeve, the first pair of guide rollers opposing each other and defining a channel into which the shoulder portions of the elongated structure enters to engage the guide rollers.

3. The apparatus of claim 2, wherein each of the guide rollers is mounted on a guide roller mounting member offset from the bottom portion of one of the frame side panels adjacent thereof.

4. The apparatus of claim 2, wherein the guide members further comprise a second pair of guide rollers mounted within the sleeve, the second pair of guide rollers longitudinally offset from the first pair of guide rollers, and the first and second pairs of guide rollers together defining the channel.

5. The apparatus of claim 2, wherein guide rollers are each mounted on a spring such that each guide roller is movable laterally.

6. The apparatus of claim 2, wherein the pair of guide rollers are each mounted on an opposing guide roller mounting member offset from the bottom portions of the frame side panels.

7. The apparatus of claim 1, wherein the roll mounting assembly comprises:

a pair of mounting walls each connected to the first and second frame side panels, the pair of mounting walls facing each other to define a receiving space to receive the film roll, wherein the film roll is adapted to hold a length of the adhesive film wrapped around an axis, and, when received in the receiving space, the film roll is rotatable to unwind the wrapped adhesive film in at least a direction toward the trail end of the apparatus.

8. The apparatus of claim 1, wherein the frame side panels extend in a longitudinal direction and the film roll has a rotating axis which, when securely received, defines a lateral direction, the film roll being fixable in the lateral direction such that a length of film unwound from the film roll maintains a consistent lateral position in relation to the elongated structure.

9. The apparatus of claim 8, wherein the film roll, when securely received, is laterally fixed in a central position such that the film unwound from the film roll maintains a central lateral position in relation to the elongated structure.

10. The apparatus of claim 1, further comprising:
a dividing panel disposed across the two opposing frame side panels such that the second layer of the film, after being separated from the first layer and directed toward the leading end of the apparatus, is substantially prevented from contacting the top surface of the elongated structure.

11. An apparatus for dispensing an adhesive film onto a top surface of a handrail having a handrail width, the apparatus comprising:
amounting frame having first and second frame side panels opposing each other, the frame side panels together defining a trailing end, a leading end, a top side and a bottom side for the apparatus, and bottom portions of the first and the second frame side panels defining a sleeve having a sleeve width at least the same as the handrail width;
guide members on the bottom portions of the first and the second frame side panels to engage shoulder portions of the handrail to allow movement of the apparatus in relation to the handrail while the guide members remains engaged with the shoulder portions; and
a film roll assembly including a film roll mounting member and a film roll securely mounted on the film roll mounting member, wherein the film roll assembly is connected to the mounting frame on the top side of the apparatus and the film roll holds an adhesive film wrapped around an axis wherein the film roll comprises a two-layer film having a first layer and a second layer, and a separation bar adjacent the trailing end of the apparatus, the separation bar assisting to separate the two-layer film unwound from the film roll into the first layer and the second layer such that the first layer is directed to the trailing end of the apparatus onto the top surface of the handrail while the second layer is directed toward the leading end of the apparatus;
wherein the apparatus is hand useable and is configured to dispense an adhesive film onto a stationary handrail.

12. The apparatus of claim 11, wherein the guide members comprise at least a pair of guide rollers mounted within the sleeve, the pair of guide rollers opposing each other and defining a channel into which the shoulder portions of the handrail enters to engage the guide rollers.

13. The apparatus of claim 11, wherein the film roll mounting member comprises:
a pair of mounting walls each connected to one of the first and second frame side panels, the pair of mounting walls facing each other to define a receiving space to receive the film roll, wherein the film roll, when received in the receiving space, is easily rotatable to unwind the wrapped adhesive film in at least a direction toward the trailing end of the apparatus.

14. The apparatus of claim 11, wherein the first layer is an application film to be applied on the top surface of the handrail, and the second layer is a liner layer.

15. The apparatus of claim 14, wherein, when the two-layer film is wrapped toward the trailing end of the apparatus, the application film is on top of the liner.

16. The apparatus of claim 11, wherein the second layer is directed toward the leading end of the apparatus through a channel adjacent to the bottom side of the mounting frame.

17. The apparatus of claim 11, wherein the frame side panels have an elongated shape extending in a longitudinal direction parallel to the handrail and the film roll has a rotating axis which, when securely received, defines a lateral direction, the film roll, when securely received, being laterally fixable in a central position such that a film unwound from the film roll maintains a consistent lateral central position in relation to the handrail.

18. The apparatus of claim 11, wherein the adhesive film has a width that matches the handrail width.

19. The apparatus of claim 11, wherein the adhesive film has a width greater than the handrail width such that the film, when centered on the top surface of the handrail, laterally extends to cover a shoulder portion of the handrail.

* * * * *

UNITED STATES PATENT AND TRADEMARK OFFICE
CERTIFICATE OF CORRECTION

PATENT NO. : 7,182,117 B2  Page 1 of 1
APPLICATION NO. : 10/698345
DATED : February 27, 2007
INVENTOR(S) : Hidetoshi Abe

It is certified that error appears in the above-identified patent and that said Letters Patent is hereby corrected as shown below:

Column 9,
Line 35, Delete "VS 10482" and insert -- VS10482 --, therefor. (Consider space)

Column 11,
Line 8, In Claim 7, delete "trail" and insert -- trailing --, therefor.
Line 30, In Claim 11, delete "amounting" and insert -- a mounting --, therefor.
Line 46, In Claim 11, delete "holds" and insert -- codes --, therefor.

Signed and Sealed this

Fourth Day of March, 2008

JON W. DUDAS
*Director of the United States Patent and Trademark Office*